United States Patent [19]
Rohr et al.

[11] 3,880,903
[45] Apr. 29, 1975

[54] N-(CYANOALKY)-3,5-DICHLOROBENZAMIDE

[75] Inventors: Wolfgang Rohr, Mannheim; Karl-Heinz Koenig, Frankenthal; Adolf Fischer, Mutterstadt, all of Germany

[73] Assignee: Badische Anilin- & Soda-Fabrik Aktiengesellschaft, Ludwigshafen (Rhine), Germany

[22] Filed: July 17, 1972

[21] Appl. No.: 272,367

[30] Foreign Application Priority Data
Aug. 12, 1971 Germany............................ 2140438

[52] U.S. Cl.................. 260/465 D; 71/105; 71/111; 71/118; 260/471 A; 260/558 D

[51] Int. Cl.................. C07c 103/22; C07c 121/78
[58] Field of Search.................................. 260/465 D

[56] References Cited
UNITED STATES PATENTS
3,457,294   7/1969   Crovetti et al...................... 260/465

*Primary Examiner*—Lewis Gotts
*Assistant Examiner*—Dolph H. Torrence
*Attorney, Agent, or Firm*—Johnston, Keil, Thompson & Shurtleft

[57] ABSTRACT

New and valuable substituted benzamides having good herbicidal properties and a process for controlling the growth of unwanted plants with these compounds.

4 Claims, No Drawings

N-(CYANOALKY)-3,5-DICHLOROBENZAMIDE

This invention relates to new and valuable substituted benzamides having herbicidal properties, herbicides containing these compounds and the use of these compounds as herbicides.

It is known to use N-(1,1-dimethyl-2-butynyl)-3,5-dichlorobenzamide as a herbicide. However, its action is unsatisfactory.

We have now found that benzamides of the formula

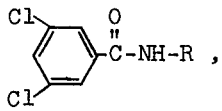

where R denotes alkyl or alkenyl branched on the carbon atom in α-position to nitrogen and which is unsubstituted or substituted one or more times by halogen, cyano, hydroxy, ether, carbalkoxy, aryl (phenyl) or cycloalkyl (cyclohexyl), or R denotes α,α,β-trimethylbutynyl, α,α-diethylpropynyl, α-methyl-α-ethylpropynyl, α-methylpropynyl, α-methyl-α-ethynylbenzyl or α-methyl-α-ethynylisobutyl, or R denotes a cycloaliphatic radical of a maximum of 11 carbon atoms, have a strong herbicidal action.

The compounds have a particularly good action on grassy weeds in the following crops: Soja hispida, Brassica spp., and Lattica spp. at application rates of 1 to 5 kg per hectare.

The compounds are generally prepared by reacting 3,5-dichlorobenzoyl chloride in the presence of an acid acceptor with a suitable amine of the formula $$H_2N-R,$$

where R has the above meanings.

It is preferred to add 3,5-dichlorobenzoyl chloride to a solution of the amine and acid acceptor in a suitable inert solvent. The following may be used as acid acceptors: triethylamine, pyridine, N,N-dimethylaniline, potassium carbonate, sodium carbonate, or an equivalent or excess amount of the amine to be reacted. The solvent may be any inert organic solvent, i. e., a solvent which, under the reaction conditions, does not react with any of the components or with the desired end product. Examples of such solvents are benzene, tetrahydrofuran, toluene, ether, 1,2-diethoxyethane, etc.

The mixture is stirred at a temperature of from 0° to 100°C until the reaction is over. The reaction may also be carried out in an aqueous solvent system or in a two-phase system comprising one of the water-insoluble solvents mentioned above and an acid acceptor such as, for instance, an alkali metal hydroxide, sodium carbonate or sodium bicarbonate, at a temperature of from about 0° to 50°C.

The preparation of the compounds is illustrated in the following example:

EXAMPLE 1

At 0° to 5°C, a solution of 13 parts by weight of 3,5-dichlorobenzoyl chloride in 50 parts by weight of benzene is added to a solution of 11 parts by weight of 1-cyanoisopropylamine (95 wt. %) in 150 parts by weight of benzene. The mixture is stirred overnight and then washed with dilute hydrochloric acid and water. The crude N-(1-cyanoisopropyl)-3,5-dichlorobenzamide was obtained from the organic phase after drying with magnesium sulfate and evaporation of the solvent.

Melting point: 135° to 138°C. After crystallization from benzene the compound melts at 140° to 141°C.

The compound has the following structural formula:

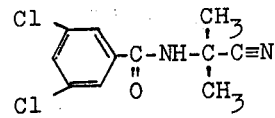

The following compounds were obtained in similar manner:

N-(2-methoxyisopropyl)-3,5-dichlorobenzamide, m.p. 107° to 108°C;

N-(2-ethoxyisopropyl)-3,5-dichlorobenzamide, m.p. 77° to 79°C;

N-(2-cyanoisopropyl)-3,5-dichlorobenzamide, m.p. 138° to 141°C;

N-(cyano-tert-butyl)-3,5-dichlorobenzamide, m.p. 134° to 135°C;

N-(2-chloroisopropyl)-3,5-dichlorobenzamide, m.p. 120°C;

N-[1,1,2-trimethylbutyn-(3)-yl-(1)-]-3,5-dichlorobenzamide, m.p. 111° to 112°C;

3,5-dichlorobenzoic-[α,α-dimethyl-(β-chloroethyl)]-amide, m.p. 131° to 132°C;

3,5-dichlorobenzoic-[α,α-dimethyl-(β-hydroxyethyl)]-amide, m.p. 92° to 93°C;

3,5-dichlorobenzoic-[α,α,β-trimethylpropyl]-amide, m.p. 112° to 114°C;

3,5-dichlorobenzoic-[bicyclo-(2,2,1)-heptyl]-amide, m.p. 151° to 152°C;

3,5-dichlorobenzoic-[α-methyl-(β-chloroethyl)]-amide, m.p. 120°C;

3,5-dichlorobenzoic-[α-chloromethyl-(propyl)]-amide, m.p. 126° to 127°C;

3,5-dichlorobenzoic-[α,α-dimethyl-(γ-hydroxypropyl)]amide, m.p. 95° to 96°C;

3,5-dichlorobenzoic-[α,α-diethyl-(propynyl)]-amide, m.p. 105° to 106°C;

3,5-dichlorobenzoic-[α-methyl-α-ethyl-(propynyl)]-amide, m.p. 94° to 95°C;

3,5-dichlorobenzoic-[α-methylisobutyl]-amide;
3,5-dichlorobenzoic-[α,α-dimethyl-(β-methoxyethyl)]-amide;
3,5-dichlorobenzoic-[α-ethylpropyl]-amide;
3,5-dichlorobenzoic-[α-norbornylethyl]-amide;
3,5-dichlorobenzoic-[α-methylpropynyl]-amide;
3,5-dichlorobenzoic-[α-methyl-(β-hydroxyethyl)]-amide;
3,5-dichlorobenzoic-[α-ethyl-(β-hydroxyethyl)]-amide;
3,5-dichlorobenzoic-[α,α-dimethylpropyl]-amide;
3,5-dichlorobenzoic-[α-ethylpropyl]-amide;
3,5-dichlorobenzoic-norbornylamide;
3,5-dichlorobenzoic-[(α-ethynyl)-α-methylbenzyl]-amide;
3,5-dichlorobenzoic-[(α-ethynyl)-α-methylisobutyl]-amide;
3,5-dichlorobenzoic-[α,α-dimethylbenzyl]-amide;
3,5-dichlorobenzoic-[α,α-dimethylisobutyl]-amide;

3,5-dichlorobenzoic-[α,α-dimethyl-(β-carbomethoxyethyl)]-amide.

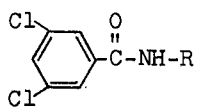

R:

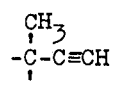   m.p. 93° to 95°C

   m.p. 105° to 106°C

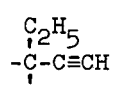   m.p. 93° to 96°C

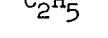   m.p. 124° to 127°C

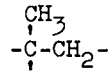   m.p. 78°C

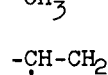   m.p. 112° to 114°C

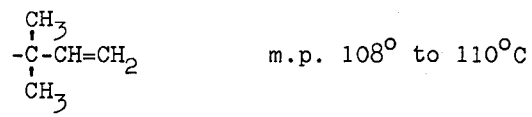   m.p. 108° to 110°C

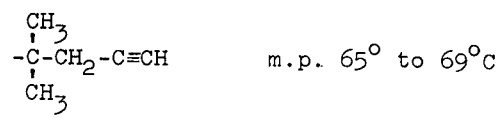   m.p. 65° to 69°C

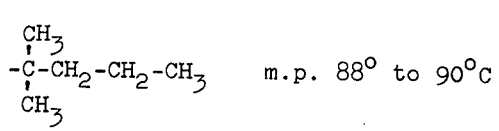   m.p. 88° to 90°C

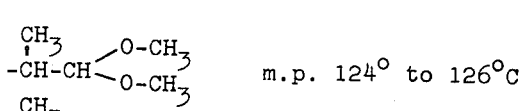   m.p. 124° to 126°C

   m.p. 126°C

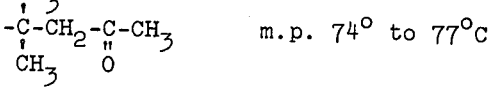   m.p. 74° to 77°C

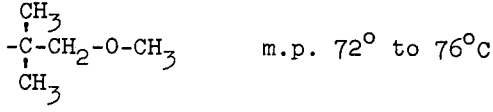   m.p. 72° to 76°C

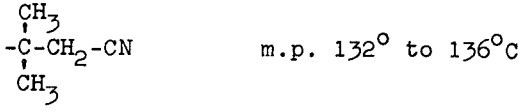   m.p. 132° to 136°C

Some of the amine components which may be reacted in similar manner are given below:

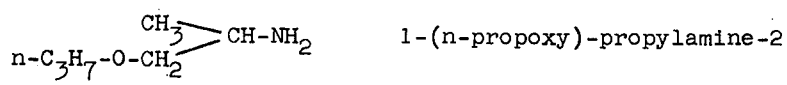   1-(n-propoxy)-propylamine-2

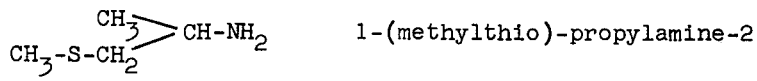   1-(methylthio)-propylamine-2

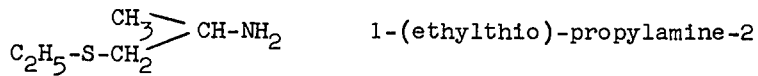   1-(ethylthio)-propylamine-2

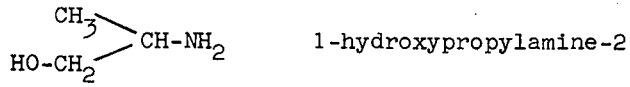   1-hydroxypropylamine-2

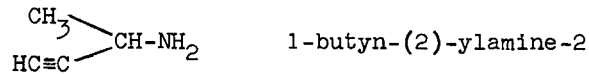   1-butyn-(2)-ylamine-2

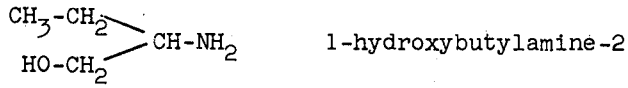   1-hydroxybutylamine-2

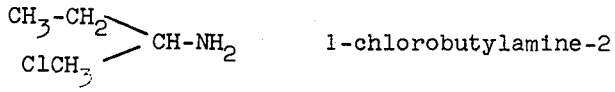   1-chlorobutylamine-2

| Structure | Name |
|---|---|
| CH₃CH₂\\CH-NH₂ / CH₃-O-CH₂ | 1-methoxybutylamine-2 |
| CH₃CH₂\\CH-NH₂ / CH₃-S-CH₂ | 1-methylthiobutylamine-2 |
| CH₃CH₂\\CH-NH₂ / C₂H₅-S-CH₂ | 1-ethylthiobutylamine-2 |
| CH₃CH₂\\CH-NH₂ / C₂H₅-O-CH₂ | 1-ethoxybutylamine-2 |
| CH₃CH₂\\CH-NH₂ / CH₃CH₂ | n-pentylamine-3 |
| CH₃CH₂\\CH-NH₂ / CH₃-CH(CH₃) | 2-methylpentylamine-3 |
| (CH₃)₂CHCH₂\\CH-NH₂ / (CH₃)₂CHCH₂ | 1,3-bis-(isopropyl)-isopropylamine |
| CH₃\\CH-NH₂ / (CH₃)₂CH | 2-methylbutylamine-3 |
| CH₃\\CH-NH₂ / (CH₃)₂CH-CH₂ | 2-methylpentylamine-4 |
| CH₃\\CH-NH₂ / (CH₃)₂CH-CH₂-CH₂ | 2-methylhexylamine-5 |
| norbornyl-CH(CH₃)-NH₂ | norbornyl-(2)-ethylamine-(1') |
| CH₃\\CH-NH₂ / (CH₃)₃C | tert-butyl-(1)-ethylamine-(1) |
| [(CH₃)₂CH]₂-CH-NH₂ | bis-(isopropyl)-methylamine |
| CH₃\\CH-NH₂ / CH₃(CH₂)₃-CH(CH₃) | 5-methylheptylamine-6 |
| CH₃\\CH-NH₂ / CH₃-CH₂-CH(CH₃) | 3-methylpentylamine-4 |
| CH₃\\CH-NH₂ / NC | 1-cyanoethylamine-(1) |

| Structure | Name |
|---|---|
| NC-CH₂-CH(CH₃)-NH₂ | 1-cyanopropylamine-2 |
| C₆H₁₁-NH₂ (cyclohexyl) | norbornylamine |
| CH₃-OCH₂-C(CH₃)₂-NH₂ | 1,1-dimethyl-2-methoxyethylamine-1 |
| C₂H₅-O-CH₂-C(CH₃)₂-NH₂ | 1,1-dimethyl-2-ethoxyethylamine-1 |
| C₃H₇-O-CH₂-C(CH₃)₂-NH₂ | 1,1-dimethyl-2-propoxyethylamine-1 |
| HO-CH₂-C(CH₃)₂-NH₂ | 1,1-dimethylethanol-2-amine-1 |
| HO-CH₂-CH₂-C(CH₃)₂-NH₂ | 1,1-dimethylpropanol-3-amine-1 |
| HO-CH₂CH₂-CH₂-C(CH₃)₂-NH₂ | 1,1-dimethylbutanol-4-amine-1 |
| ClCH₂-C(CH₃)₂-NH₂ | 1,1-dimethyl-2-chloroethylamine-1 |
| ClCH₂CH₂-C(CH₃)₂-NH₂ | 1,1-dimethyl-3-chloropropylamine-1 |
| ClCH₂CH₂CH₂-C(CH₃)₂-NH₂ | 1,1-dimethyl-4-chlorobutylamine-1 |
| HO-CH₂-C(CH₃)(CH₂OH)-NH₂ | 1,1-bis-(hydroxymethyl)-ethylamine-1 |
| HO-CH₂-C(CH₂OH)₂-NH₂ | 1,1,1-tris-(hydroxymethyl)-methylamine |
| ClCH₂-C(CH₃)(CH₂Cl)-NH₂ | 1,1-bis-(chloromethyl)-ethylamine-(1) |
| ClCH₂-C(CH₂Cl)₂-NH₂ | 1,1,1-tris-(chloromethyl)-methylamine |
| H₂C=CH-C(CH₃)₂-NH₂ | 1,1-dimethylpropen-(2)-ylamine-1 |

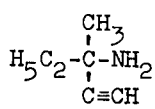 3-methylbutyn-(4)-ylamine-(3)

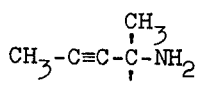 1,1-dimethylbutyn-(2)-ylamine-1

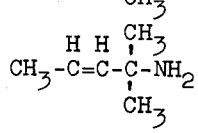 1,1-dimethylbuten-(2)-ylamine-1

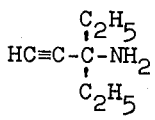 1,1-diethylpropyn-(2)-ylamine-1

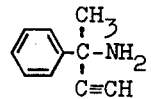 1-(ethynyl)-1-phenylethylamine-1

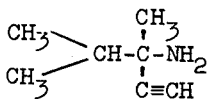 2-(ethynyl)-3-methylbutylamine-2

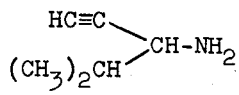 1-(ethynyl)-2-methylpropylamine-1

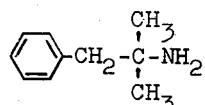 1,1-dimethyl-2-phenylethylamine-1

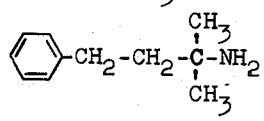 1,1-dimethyl-3-phenylpropylamine-1

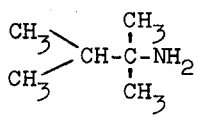 1,1,2-trimethylpropylamine-1

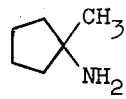 1-methylcyclopentylamine-1

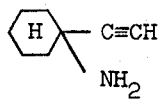 1-ethynylcyclohexylamine-1

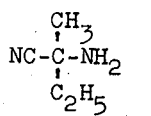 2-cyanobutylamine-2

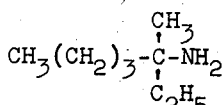 2-ethylhexylamine-2

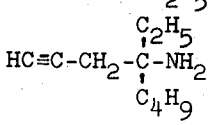 2-propargylheptylamine-2

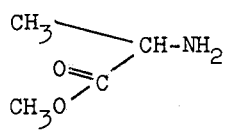 methyl α-aminopropionate

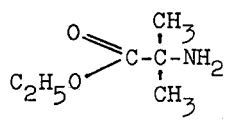 ethyl α,α-dimethylaminoacetate

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, hydrocarbons having boiling points higher than 150°C, e. g. tetrahydronaphthalene or alkylated naphthalenes, or organic liquids having boiling points higher than 150°C and having one or more than one functional group, e. g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e. g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e. g. kieselguhr, talc, clay or fertilizers.

The action of the new active ingredients is illustrated in the following examples.

EXAMPLE 2

An agricultural plot was sown with Soja hispida, Brassica spp., Poa annua, Poa trivialis, Bromus tectorum and Echinochloa crus-galli. The soil prepared in this manner was then immediately treated with 2 kg per hectare of each of the following active ingredients, each compound being dispersed in 500 liters of water per hectare:
I N-(1-cyanoisopropyl)-3,5-dichlorobenzamide
II N-(2-methoxyisopropyl)-3,5-dichlorobenzamide
III N-(2-ethoxyisopropyl)-3,5-dichlorobenzamide
IV N-(1,1-dimethyl-2-butynyl)-3,5-dichlorobenzamide (comparative agent)

After 4 to 5 weeks it was ascertained that active ingredients I, II and III had better crop plant compatibility than IV, combined with the same good herbicidal action.

The results of the experiment are given in the following table:

|  | Active ingredient | | | |
|---|---|---|---|---|
|  | I | II | III | IV |
| Soja hispida | 0 | 0 | 0 | 15 |
| Brassica spp. | 10 | 10 | 5 | 35 |
| Poa annua | 100 | 95 | 95 | 95 |
| Poa trivialis | 95 | 95 | 95 | 95 |
| Bromus tectorum | 95 | 90 | 90 | 90 |
| Echinochloa crus-galli | 95 | 90 | 90 | 90 |

0 = no damage
100 = complete destruction

The action of the following compounds corresponds to that of I, II and III:
N-(2-cyanoisopropyl)-3,5-dichlorobenzamide
N-(cyano-tert-butyl)-3,5-dichlorobenzamide
3,5-dichlorobenzoic-2-chloroisopropylamide
3,5-dichlorobenzoic-α-hydroxy-tert-butylamide
3,5-dichlorobenzoic-α-methylisobutylamide

EXAMPLE 3

An agricultural plot with Brassica spp., Poa annua, Poa trivialis and Dactylis glomerata growing on it was treated at a growth height of the plants of 2 to 8 cm with 3 kg per hectare of N-(2-methoxyisopropyl)-3,5-dichlorobenzamide (I) and with 3 kg per hectare of N-(2-ethoxyisopropyl)-3,5-dichlorobenzamide (II), each active ingredient being emulsified in 500 liters of water per hectare.

After 3 to 4 weeks Poa annua, Poa trivialis and Dactylis glomerata were completely withered, whereas Brassica spp. continued to grow almost undamaged.

EXAMPLE 4

90 parts by weight of compound I from Example 2 is mixed with 10 parts by weight of N-methyl-α-pyrrolidone. A mixture is obtained which is suitable for application in the form of very fine drops.

EXAMPLE 5

20 parts by weight of compound II from Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.20 percent by weight of the active ingredient.

EXAMPLE 6

20 parts by weight of compound III from Example 2 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 7

20 parts by weight of compound I from Example 2 is dissolved in a mixture consisting of 25 parts by weight of cyclohexanol, 65 parts by weight of a mineral oil fraction having a boiling point between 210° and 280°C, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02 percent by weight of the active ingredient.

EXAMPLE 8

20 parts by weight of compound II from Example 2 is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 9

3 parts by weight of compound I from Example 2 is intimately mixed with 97 parts by weight of particulate kaolin. A dust is obtained containing 3 percent by weight of the active ingredient.

EXAMPLE 10

30 parts by weight of compound II from Example 2 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. The compound of the formula

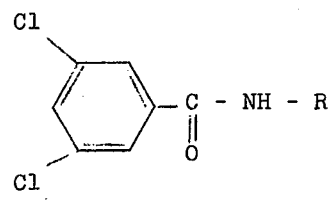

where R is alkyl of 3 to 4 carbon atoms branched on the carbon atom in α-position to nitrogen, said alkyl being substituted by cyano.

2. N-(1-cyanoisopropyl)-3,5-dichlorobenzamide.
3. N-(2-cyanoisopropyl)-3,5-dichlorobenzamide.
4. N-(cyano-tert-butyl)-3,5-dichlorobenzamide.

* * * * *